Nov. 15, 1966 W. C. AMES ET AL 3,284,973
CEMENT FINISHING APPARATUS
Filed April 10, 1964 3 Sheets-Sheet 1
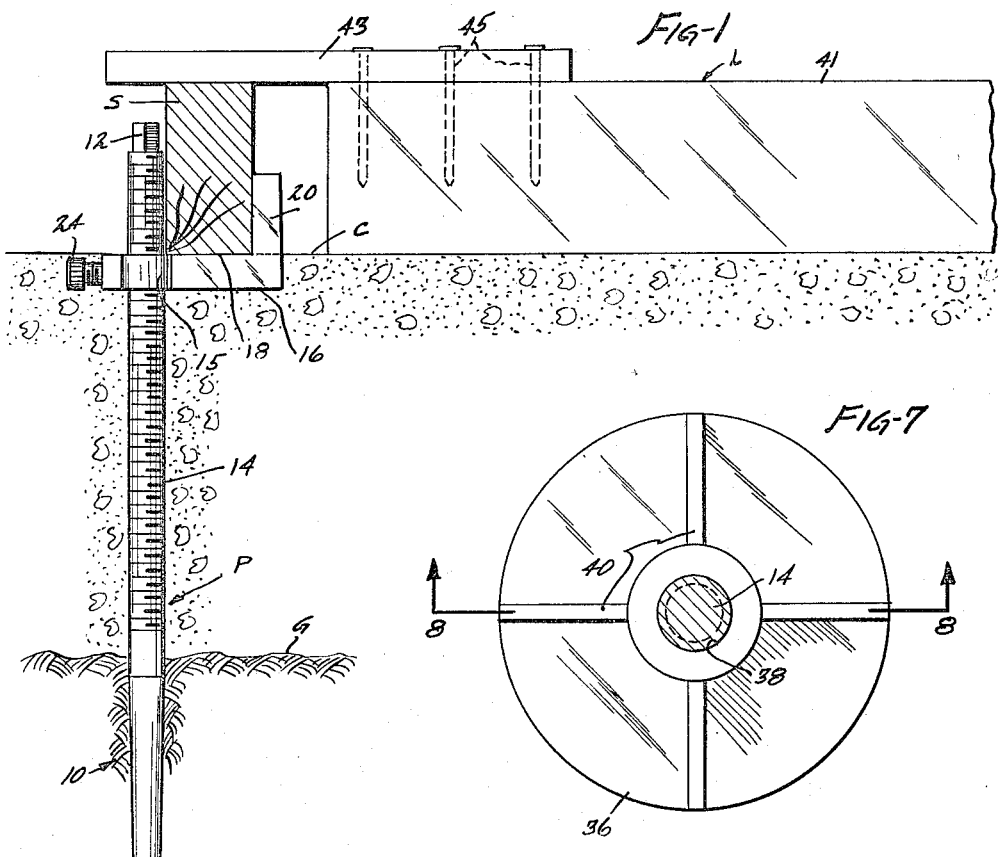
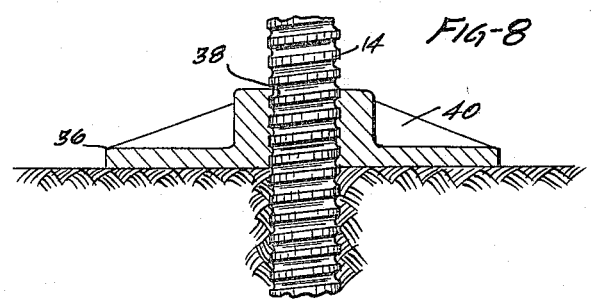
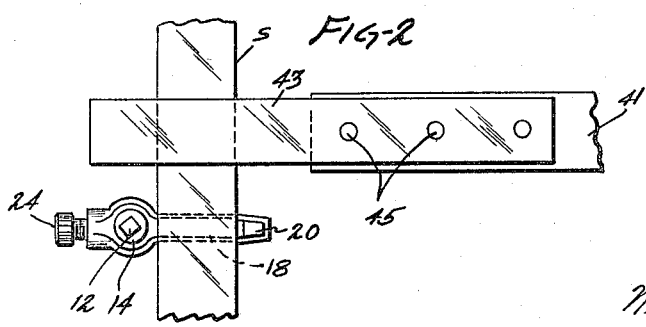
INVENTORS
WILFORD C. AMES
RICHARD W. WALLEN
BY
Nilsson, Robbins & Anderson
ATTORNEYS Nov. 15, 1966   W. C. AMES ET AL   3,284,973
CEMENT FINISHING APPARATUS
Filed April 10, 1964   3 Sheets-Sheet 2
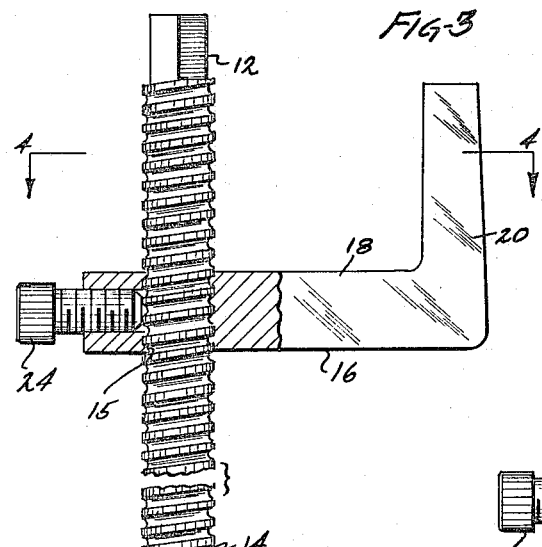
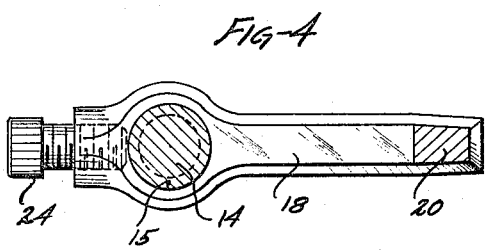
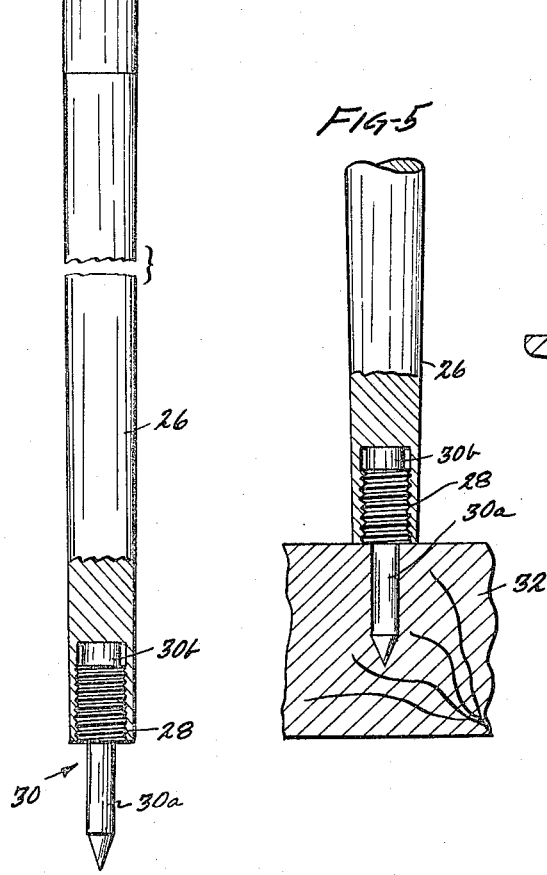
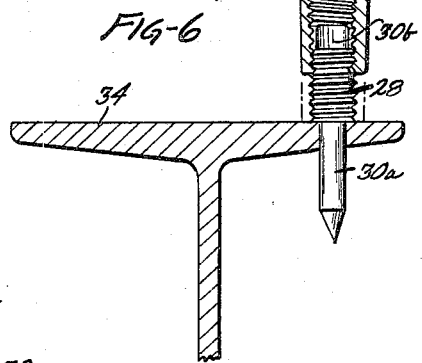
INVENTORS
WILFORD C. AMES
RICHARD W. WALLEN
BY
Nilsson, Robbins & Anderson
ATTORNEYS Nov. 15, 1966 W. C. AMES ET AL 3,284,973
CEMENT FINISHING APPARATUS
Filed April 10, 1964 3 Sheets-Sheet 3
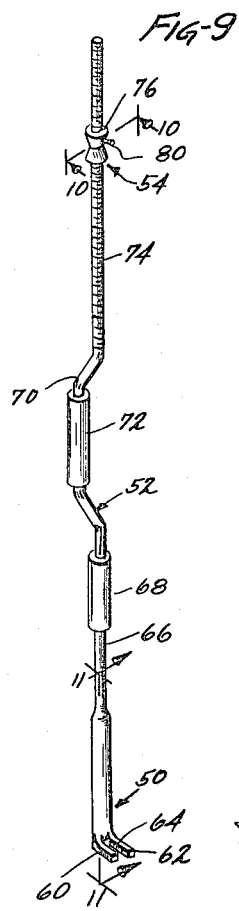
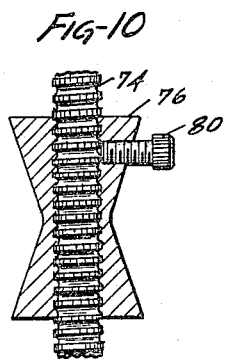
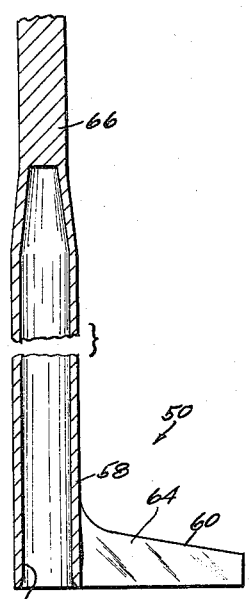
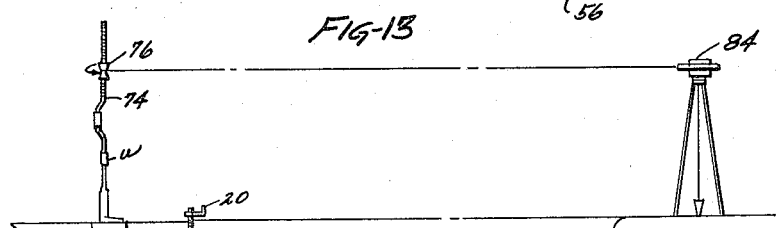
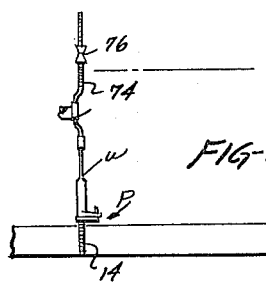
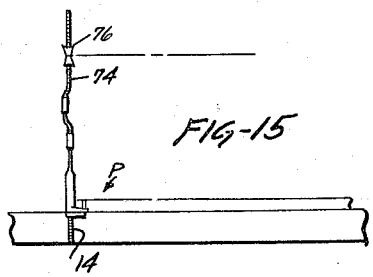
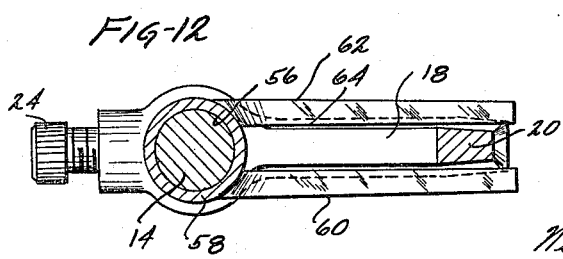
INVENTORS
WILFORD C. AMES
RICHARD W. WALLEN
BY
Nilsson, Robbins & Anderson
ATTORNEYS

United States Patent Office 3,284,973
Patented Nov. 15, 1966

3,284,973
CEMENT FINISHING APPARATUS
Wilford C. Ames, 649 San Lorenzo St., P.O. Box 3, Santa Monica, Calif., and Richard W. Wallen, Littlerock, Calif.; said Wallen assignor to said Ames
Filed Apr. 10, 1964, Ser. No. 358,840
2 Claims. (Cl. 52—155)

This application is a continuation-in-part of my co-pending application Serial No. 111,611, filed May 22, 1961, entitled, Cement Finishing Appliance, and now abandoned.

The present invention relates to a cement-forming appliance and particularly to an apparatus for use as in plurality, to establish a surface and support a screed as used in the formation of concrete structure surfaces.

In the process of forming cement surfaces, it is common practice to employ a screed or elongated member which provides a support to guide a screed stick that engages and contours the cement to form the desired surface. In this manner, the desired structural form is imparted to the cement which may then be finished or otherwise surfaced before the cement sets and becomes concrete.

Sometimes the screed stick may ride on cement forms; however, often the surfacial area of the cement is too large to employ a screed stick or other surfacing tool between the forms. In such instances, it is common practice to fix screed posts to the base medium (which is to support the cement) which posts then support the screed. The screed posts are affixed to the base medium by a variety of techniques, depending upon the nature of the base medium. For example, if the cement is to be poured over bare ground, the screed post is usually force-driven into the ground. However, in some instances, the screed post encounters bottomless sub-ground, which yields when a load is applied to the post. Of course, in such cases, a dip or other irregularity is formed in the cement, and becomes a defect in the concrete structure.

In some instances, screed posts must be set upon concrete or steel structures as a base medium, which operation normally causes considerable effort and expense. For example, one method of setting a screed post upon a steel structure involves the use of a separate support device which is tap-welded between the screed post and the steel structure. The high cost of such an operation is apparent.

In view of the different techniques employed to position or mount screed posts depending on the base or supporting medium, different types of posts are often used in different applications. Therefore, it is sometimes necessary for a cement contractor to possess several different types of screed posts and related appliances, some of which are seldom used.

One type of screed post employs a spiked tip which may be driven in the ground to support the post erect. In general, this tip receives considerable abuse, and is often broken or damaged. In prior structures a damaged tip necessitated removal from the field for repair or replacement. As a result, considerable expense has been involved in maintaining prior screed posts operative.

After screed posts are set on or in a supporting base structure, screed hooks affixed to the posts are set at a desired level to support the screed. In the past, screed hooks have been set, using an instrument, e.g. level or transit, to indicate the desired height, which is then announced to instruct the person actually setting the hook. One prior structure by which the hook is set incorporates a set screw threadably received in the hook to engage the screed post. In the process of setting such a screed hook, deviations from the desired setting often occur as the set screw is turned down on the post. Furthermore, the difficulty of manually fixing the hook at the desired level often accounts for considerable variation between a group of screed hooks which in turn causes irregularities in the concrete surface that is formed.

In view of these considerations, a need exists for a single universal screed post which may be used on various base mediums, which may be simply and easily repaired in the event of spike breakage, and which includes a screed hook that may be easily and accurately set at a desired height as by use of a screed hook setting tool.

In general, the present invention comprises a screed post including an elongated generally-cylindrical member having an externally-threaded section to receive an internally-threaded screed hook and an internally-threaded support plate. Furthermore, the base end of the cylindrical member is internally-threaded to receive a spiked stud which may be easily replaced in the field, if damaged, and is expandable to certain types of base structure.

Still further, the present invention incorporates an adjustment mechanism for integral use with the screed post, whereby the screed hook can be efficiently and accurately placed at the desired level on the said externally threaded section.

An object of the present invention is to provide an improved screed post for use in cement work.

Another object of the present invention is to provide a screed post which may be economically manufactured and used.

Still another object of the present invention is to provide a screed post which may be simply and precisely set to a desired level for supporting a screed.

A further object of the present invention is to provide an economical screed post which may be simply and easily set in various base mediums.

Still a further object of the present invention is to provide a screed post which may be simply and easily repaired if the point thereof is broken or damaged.

One further object of the present invention is to provide a screed arrangement for setting screed posts at considerable savings of labor and with fine accuracy.

Still one further object of the present invention is to provide an adjustment structure for integral use with a screed post of the present invention, which structure is economical, effective and accurate to an improved degree.

These and other objects of the present invention will become apparent from a consideration of the following, taken in conjunction with the drawings, wherein:

FIGURE 1 is an elevational view showing apparatus of the present invention in use;

FIGURE 2 is a plan view of a portion of the apparatus of FIGURE 1;

FIGURE 3 is a partly sectionalized elevational view of an apparatus constructed in accordance with the present invention;

FIGURE 4 is a horizontal sectional view taken along line 4—4 of FIGURE 3;

FIGURE 5 is a fragmentary view of FIGURE 4 showing the apparatus set in a wooden beam;

FIGURE 6 is another fragmentary view of FIGURE 4 showing the apparatus set in a steel beam;

FIGURE 7 is a plan view of a portion of the apparatus of the present invention which may be employed to set the structure in earth;

FIGURE 8 is a sectional view taken along line 8—8 of FIGURE 7;

FIGURE 9 is a perspective view of adjustment apparatus of the present invention;

FIGURE 10 is a vertical sectional view taken along line 10—10 of FIGURE 9;

FIGURE 11 is a vertical sectional view taken along line 11—11 of FIGURE 9;

FIGURE 12 is a plan view of the structure of FIGURE 9 in engagement with the structure of FIGURE 1; and FIGURE 13, 14 and 15 are diagrammatic representations, illustrating the manner in which the structure of the present invention is employed.

Referring initially to FIGURE 1, there is shown a screed post P of the present invention supporting a screed S, the upper surface of which carries a screed stick L to form the upper surface of cement C. The screed post P is supported in ground G and provides an adjustable support for the screed S that in turn provides a reference surface over which the screed stick L may be moved.

Referring now to FIGURES 2, 3 and 4 along with FIGURE 1 the apparatus of the present invention will be considered in greater detail. The screed post P includes an elongated generally-cylindrical shaft 10 having a square head 12 at the top, above an externally-threaded section 14 which section is received in an internally-threaded bore 15 of a screed hook 16. The screed hook includes a support portion 18 extending perpendicularly from the threaded section 14, which portion terminates in an upwardly-extending hook section 20. Remote from the hook section 20, the screed hook is enlarged to contain the internally-threaded bore 15 into which a transversely-mounted set screw 24 is turned.

Below the threaded section 14, the elongated shaft 10 comprises a tapered portion 26 which terminates in a concentric internally-threaded bore 28 to receive a spiked stud 30 including a spike 30a and a threaded section 30b.

The screed post P may be manufactured by employing a variety of techniques; however, one method of manufacture involves machining the cylindrical shaft 10 from steel, and casting the screed hook 16, also from steel. The spiked stud 30 may be formed of carbon steel to withstand considerable abuse.

The manner of using a structure constructed in accordance with the principles of the present invention varies depending on the base medium in which the structure is placed. If the structure is placed in earth (as shown in FIGURE 1) it is force-driven into the ground by striking the upper surface of the square head 12. After the post has been set, in this manner, the screed hook 16 (with the set screw 24 loose) is revolved on the threaded section 14 until the upper surface of the portion 18 of the hook is at the desired level. In practice, it will be customary to employ an instrument to obtain the desired level for the screed hook, then simply turn the hook to that level. In one practical form of the present invention, each complete revolution of the screed hook 16 moves the screed hook up or down on the member 10 a distance of ⅛ inch. Therefore, the instrument might indicate that the screed hook should be raised a quarter of an inch thereby manifesting that two revolutions of the screed hook 18 will bring it to the desired level. Further details in setting the screed hook 18 at the desired level are provided below. Upon properly positioning the screed hook 18, the set screw 24 is turned down on the threaded section 14 to fix the position of the hook and with the hook so set, no problems of sliding are encountered.

It is to be noted, that in driving the screed post into the ground, the spike of the stud 30 often encounters rocks and other solid strata which may damage or break the stud. In prior screed post apparatus, such damage necessitated that the entire unit be replaced or returned to a repair shope to be rebuilt. However, in the structure of the present invention, the stud 30 is simply removed from the bore 28 and replaced by another stud thereby providing the unit ready for service by a simple and easy operation.

In using the screed post structure of the present invention on a wooden beam 32 as shown in FIGURE 5, the spiked section 30a of the stud 30 is simply driven into the beam to support the screed post. The screed post is then normally removed from the beam simply by withdrawing the stud 30.

To set the screed post of the present invention on a base medium of structural steel as the beam 34 (FIGURE 6) the stud 30 may be set in the beam 34 as by an explosive charge from a gun as commonly employed for this purpose. The bore 28 then receives the threaded section 30b of the stud to provide support for the screed post. At the time when it is desired to remove the screed post, a wrench is placed on the square head 12 to revolve the screed post and turn the structure off the stud 30 which is expendable in this use.

In view of the above consideration, it is apparent that the structure of the present invention may be simply and easily used to enable the unit to be set in various base mediums. Furthermore, the structure may also be set in ground wherein a bottomless sub-ground is encountered which would tend to give way when load is placed upon the screed post. This structural form of the present invention is illustrated in FIGURES 7 and 8 and will now be considered in detail.

A base plate 36 is shown in FIGURES 7 and 8 containing a concentric threaded bore 38 and four reinforcing risers 40. The bore 38 receives the threaded section 14 of the cylindrical member 10 and may be variously positioned on the member 10 below the screed hook 16. If so called bottomless sub-ground is encountered, the screed post is simply driven into the ground until the bottom surface of the plate 36 encounters the ground surface at which depth, the screed post is supported by the surracial engagement between the plate 36 and the ground.

When the screed post is set on the particular base structure encountered, and the screed hook 18 is set at the desired level, the post (along with other posts) supports a screed S which carries a screed stick L. As shown in FIGURE 1, the screed stick may comprise a board 41 similar in cross section to the screed S, having an extension 43 affixed thereto by nails. Of course in the operation of sliding the screed stick L over the screed S, the cement is contoured to the desired form.

The adjustment or proper setting of the screed hook 16 with the adjustment wrench or tool of the present invention will next be considered after a structural description of the wrench, as shown in FIGURES 9, 10 and 11.

The wrench as shown in perspective in FIGURE 9 comprises a lower end 50 (for engaging the post) which end is integrally formed with a crank handle 52 and a target section 54. The overall wrench will normally be rather long and in one successful operating embodiment, a wrench length of between five and six feet has been found particularly satisfactory.

Considering the tool in further detail, the lower end 50 is tubular as shown in FIGURE 11 so as to provide a long cylindrical chamber 56 inside a tubular wall 58. Radially extending in substantially the same direction from the exterior of the wall 58 at the base thereof are a forked pair of prongs 60 and 62 providing a slot 64 therebetween which serves to engage the screed hook 16. The engaging end 50 of the wrench receives the upper end of the screed post P within the chamber 56 in a non-engaging fashion. Then, the slot 64 between the prongs 60 and 62 receives the hook section 20 of the screed hook as shown in FIGURE 12, so that the wrench is engaged to the screed hook while resting upon the screed post P for relative movement thereto.

Above the engaging end 50 of the wrench, it reduces in diameter to a rod-like length 66 the upper portion of which carries a freely rotatable, cylindrical handle 68. Above the handle 68, the wrench is curved outwardly and returned, to provide a crank section 70 which also carries a rotatable handle 72. Above the crank section 70 is a threaded section 74 of the wrench, which threadably receives a target 76 containing a set screw 80. The target 76 may take the form of a pair of frustrum members abutted end to end so that as the target is viewed in a plane, it appears as a conventional surveying target as shown in FIGURE 10.

Considering the use of the wrench of the present invention in conjunction with the screed posts as described above, and also as forming a part of the present invention, reference will now be had to FIGURES 13, 14 and 15.

Conventional and accepted practice in setting screed posts is to employ a bench mark or reference level coinciding to the upper surface of the desired concrete structure. Of course, the bench mark may take various forms as established structures or monuments which have been previously set. In one manner of using the apparatus of the present invention the wrench W is first placed upon a bench mark 82 as shown in FIGURE 13, the bench mark 82 coinciding in height to the desired height of the floor. With the wrench W so positioned, an instrument man (not shown) sights through an instrument 84 (transit or level) and the target 76 on the wrench W is adjusted to the level of the instrument 84 by releasing the set screw 80 (FIGURE 10) and turning the target. Upon accomplishing such adjustment, the set screw 80 is turned down to lock the target 76 to the threaded section 74 of the wrench.

Next, the wrench W is placed on a screed post P as shown in FIGURE 14, so that it engages the screed hook as described above with reference to FIGURE 12. The crank section of the wrench W may now be easily employed to revolve the wrench W turning the screed hook on the screed post P until the target 76 is properly aligned as shown in FIGURE 15.

When the target 76 is at indicated level, the upper edge of the screed hook 16 is at precisely the height of the bench mark 82. Therefore, when the concrete is poured, in a configuration as shown in FIGURE 1, the surface of the concrete will coincide to the upper edge of the screed hook. Of course, this situation exists because the effective operating length established on the wrench W from the bottom of the wrench to the mid-section of the target 76 establishes identical distances down from the line of sight to the bench mark 82 and to the floor level as shown in FIGURE 15. Thus, the floor level is established by the proper setting of the screed hook, which is accomplished in a minimum of time and with a minimum of effort using the wrench of the present invention. It may be readily seen, that once the wrench has been properly set, a mechanic with the wrench working in cooperation with an instrument man can set the screed hooks on a great many screed posts in a very short time and with great accuracy and permanence. That is, after the hooks are positioned, and the set screws 24 therein are tightened, they will not slip or deviate to another position, nor will they slip significantly after the height for the hook has been established.

An important aspect of the invention thus resides in a screed hook structure wherein the screed post is threadably engaged to the screed hook so that a wrench as described herein may be effectively used to set the level of the screed hook.

Another important aspect resides in the fact that the structure is usable on various support mediums and is capable of supporting a screed when mounted in ground that is not capable of supporting a stake or post under load.

Another aspect of the present invention resides in the nicety of adjustment provided by the threaded section 14 in conjunction with the screed hook 16. This aspect of the present invention also enables the use of the support plate 36 as described above.

Another important feature of the present invention resides in the provision of a square head 12 (or other wrench engagement) which enables the structure to be turned off a permanently-set stud as shown in FIGURE 6.

Still another feature of the present invention resides in the provision of the bore 28 to receive the replaceable stud 30 thereby rendering the unit capable of simple and easy repair in the field.

Although various features and concepts of the present invention have been set forth in the foregoing illustrative embodiment, the present invention is not to be limited in accordance therewith but is to be constructed in accordance with the claims set forth below.

What is claimed is:

1. A post adapted to be fixed in a base medium, for use in plurality to support a screed, comprising: an elongated, generally-cylindrical member including an externally-threaded section thereon, a generally-tapered section below said externally-threaded section terminating in an internally-threaded end, and a wrench-engaging section to facilitate revolving said member; a screed hook internally-threaded to receive said threaded section of said elongated member and extend perpendicularly therefrom to provide a hook to support said screed; set means for locking said screed hook in various positions relative to said elongated member against relative rotation therebetween; an internally-threaded support plate affixed on said threaded section of said elongated member below said screed hook, to engage said base medium and support said post; and a partially externally-threaded pointed stud having a smooth shank threadably engaged in the internally-threaded end of said elongated member whereby to facilitate placing said post in said base medium.

2. A structure for providing a desired support for a concrete-forming screed, comprising: an elongated, generally-cylindrical post, at least the upper portion of which bears external threads; a pointed stud threadably engaged with the cylindrical post at the lower end thereof to provide a penetrating point for said post; a hook member threadably engageable with said external threads on said post for supporting said screed; a wrench member engaged with said hook member for rotating said hook to adjust said hook member to various heights; target means affixed to said wrench member to indicate the level of said hook member; and lock means for locking said hook means against motion relative said post.

References Cited by the Examiner

UNITED STATES PATENTS

| 1,655,123 | 1/1928 | Badger | 104—111 |
|---|---|---|---|
| 1,772,708 | 8/1930 | Cole | 52—741 |
| 1,788,481 | 1/1931 | Brostrom | 52—365 |
| 1,852,673 | 4/1932 | Pilj | 52—678 |
| 1,988,746 | 1/1935 | Neptune | 52—679 |
| 2,224,273 | 12/1940 | Neptune | 52—679 |
| 2,227,713 | 1/1941 | Higgins | 52—365 |
| 2,319,526 | 5/1943 | Wearn | 52—678 |
| 2,373,284 | 4/1945 | Autry | 52—678 |
| 2,420,458 | 5/1947 | Barker | 81—90 |
| 2,461,639 | 2/1949 | Grigalunas | 81—90 |
| 2,551,826 | 5/1951 | Cox | 52—678 |
| 2,823,539 | 2/1958 | Kersh et al. | 52—678 |

FOREIGN PATENTS 27,988  12/1908  Sweden.

FRANK L. ABBOTT, *Primary Examiner.*

HENRY C. SUTHERLAND, *Examiner.*

J. L. RIDGILL, *Assistant Examiner.*